United States Patent
Tournier

(10) Patent No.: US 6,630,966 B1
(45) Date of Patent: Oct. 7, 2003

(54) DEVICE FOR CONTROLLING THE DISPLAYING OF CHARACTERS IN A VIDEO SYSTEM

(75) Inventor: Christian Tournier, Seyssinet-Pariset (FR)

(73) Assignee: Thomson Licensing S.A., Boulogne (FR)

(*) Notice: Subject to any disclaimer, the term of this patent is extended or adjusted under 35 U.S.C. 154(b) by 0 days.

(21) Appl. No.: 09/343,766

(22) Filed: Jun. 30, 1999

(30) Foreign Application Priority Data

Jul. 3, 1998 (FR) .................................. 98 08500

(51) Int. Cl.7 ................................................ H04N 5/50
(52) U.S. Cl. ........................ 348/569; 348/716; 345/551; 345/553
(58) Field of Search ................................ 348/569, 570, 348/714, 716, 717, 718; 345/467, 468, 469, 469.1, 470, 471, 531, 541, 543, 544, 547, 551, 553, 556, 536, 26, 803, 684, 686, 781, 973; H04N 5/50

(56) References Cited

U.S. PATENT DOCUMENTS

| 4,794,386 A | * 12/1988 | Bedrij et al. ................ 345/684 |
| 4,824,106 A | * 4/1989 | Ueda et al. ................... 463/33 |
| 5,151,954 A | 9/1992 | Takai et al. ................... 382/41 |
| 5,251,293 A | * 10/1993 | Ishii et al. .................... 345/471 |
| 5,579,057 A | * 11/1996 | Banker et al. ................ 345/472 |

FOREIGN PATENT DOCUMENTS

EP 0466935 A1 1/1992 ............ G09G/5/22

OTHER PUBLICATIONS

Article entitled: High Performance On–Screen Display for 1H/2H, Standard and Wide Aspect Ratio TV by H. Blatter dated Feb. 6, 1992.
Search Report attached (citing references listed as AA, AM and AR).

* cited by examiner

*Primary Examiner*—Michael H. Lee
(74) *Attorney, Agent, or Firm*—Joseph S. Tripoli; Ronald H. Kurdyla; Joel M. Fogelson

(57) ABSTRACT

In a device for controlling the displaying of characters for a video system, the memory for storing information relating to the displaying of the characters is partitioned into two areas. The first area (Z1, Z1') is for storing, at fixed addresses, data and parameters for general control of the display. The second area (Z2) which is divisible into spaces (B1, B2, B3) of variable sizes stores, in each of the spaces, control parameters and data relating to the displaying of a row of characters, wherein the spaces are chained together by virtue of a parameter, the address of the next memory space, stored in each space. This memory architecture offers multiple possibilities for modifying the display parameters from one row to another within one and the same "screen" whilst optimizig the size of the memory used.

15 Claims, 5 Drawing Sheets

| Address | Content |
|---|---|
| 0000h – 0003h | Global Attributes |
| 0004h – 0023h | Foreground Palette |
| 0024h – 0043h | Background Palette |
| 0044h – 0063h | Extended foreground Palette |
| 0064h – 0083h | Extended background Palette |
| 0084h – 0091h | Fixed parameters and attributes |
| 0092h – 0101h | Displayed data and attributes |
| 0102h – 0109h | Fixed parameters and attributes |
| 0110h – 0117h | Displayed data and attributes |
| 0118h – 0125h | Fixed parameters and attributes |
| 0126h – XXXh | Displayed data and attributes |
| ... | ... |

Groupings: Z1 covers 0000h–0043h; Z1' covers 0044h–0083h; B1 covers 0084h–0101h; B2 covers 0102h–0117h; B3 covers 0118h–XXXh; Z2 covers B1, B2, B3.

FIG. 3

| Address | Content | | | | | | | | | | | | | | | |
|---|---|---|---|---|---|---|---|---|---|---|---|---|---|---|---|---|
| 0084h 0085h | 15 | 14 | 13 | 12 | 11 | 10 | 9 | 8 | 7 | 6 | 5 | 4 | 3 | 2 | 1 | 0 |
| | Free | | | | | | | | No. TV line display start | | | | | | | |
| 0086h 0087h | 15 | 14 | 13 | 12 | 11 | 10 | 9 | 8 | 7 | 6 | 5 | 4 | 3 | 2 | 1 | 0 |
| | AREV | | | | ARSV | | | | Row shape attributes | | | | | | | |
| 0088h 0089h | 15 | 14 | 13 | 12 | 11 | 10 | 9 | 8 | 7 | 6 | 5 | 4 | 3 | 2 | 1 | 0 |
| | Free | | | | | | | | Next buffer address | | | | | | | |
| 0090h 0091h | 15 | 14 | 13 | 12 | 11 | 10 | 9 | 8 | 7 | 6 | 5 | 4 | 3 | 2 | 1 | 0 |
| | NCR | | | | | | | | Horizontal shift | | | | | | | |
| 0092h 0093h | 15 | 14 | 13 | 12 | 11 | 10 | 9 | 8 | 7 | 6 | 5 | 4 | 3 | 2 | 1 | 0 |
| | F.P. Address | | | | B.P. Address | | | | Character code 1 | | | | | | | |
| 0094h 0095h | Palettes address attribute 2 | | | | | | | | Character code 2 | | | | | | | |
| 0096h 0097h | Palettes address attribute 3 | | | | | | | | Character code 3 | | | | | | | |
| 0098h 0099h | Palettes address attribute 4 | | | | | | | | Character code 4 | | | | | | | |
| 0100h 0101h | Palettes address attribute 5 | | | | | | | | Character code 5 | | | | | | | |

FIG. 4a

| Address | Content | | | | | | | | | | | | | | | |
|---|---|---|---|---|---|---|---|---|---|---|---|---|---|---|---|---|
| 0102h 0103h | 15 | 14 | 13 | 12 | 11 | 10 | 9 | 8 | 7 | 6 | 5 | 4 | 3 | 2 | 1 | 0 |
| | Free | | | | | | | | No. TV line display start | | | | | | | |
| 0104h 0105h | 15 | 14 | 13 | 12 | 11 | 10 | 9 | 8 | 7 | 6 | 5 | 4 | 3 | 2 | 1 | 0 |
| | AREV | | | | ARSV | | | | Row shape attributes | | | | | | | |
| 0106h 0107h | 15 | 14 | 13 | 12 | 11 | 10 | 9 | 8 | 7 | 6 | 5 | 4 | 3 | 2 | 1 | 0 |
| | Free | | | | | | | | Next buffer address | | | | | | | |
| 0108h 0109h | 15 | 14 | 13 | 12 | 11 | 10 | 9 | 8 | 7 | 6 | 5 | 4 | 3 | 2 | 1 | 0 |
| | NCR | | | | | | | | Horizontal shift | | | | | | | |
| 0110h 0111h | 15 | 14 | 13 | 12 | 11 | 10 | 9 | 8 | 7 | 6 | 5 | 4 | 3 | 2 | 1 | 0 |
| | Serial attribute 2 | | | | | | | | Serial attribute 1 | | | | | | | |
| 0112h 0113h | Character code 2 | | | | | | | | Character code 1 | | | | | | | |
| 0114h 0115h | Character code 4 | | | | | | | | Character code 3 | | | | | | | |
| 0116h 0117h | Character code 6 | | | | | | | | Character code 5 | | | | | | | |

FIG. 4b

| Address | Content | | | | | | | | | | | | | | | | |
|---|---|---|---|---|---|---|---|---|---|---|---|---|---|---|---|---|---|
| 0118h 0119h | 15 | 14 | 13 | 12 | 11 | 10 | 9 | 8 | 7 | 6 | 5 | 4 | 3 | 2 | 1 | 0 |
| | Free | | | | | | | | No. TV line display start | | | | | | | |
| 0120h 0121h | 15 | 14 | 13 | 12 | 11 | 10 | 9 | 8 | 7 | 6 | 5 | 4 | 3 | 2 | 1 | 0 |
| | AREV | | | | ARSV | | | | Row shape attributes | | | | | | | |
| 0122h 0123h | 15 | 14 | 13 | 12 | 11 | 10 | 9 | 8 | 7 | 6 | 5 | 4 | 3 | 2 | 1 | 0 |
| | Free | | | | | Next buffer address | | | | | | | | | | |
| 0124h 0125h | 15 | 14 | 13 | 12 | 11 | 10 | 9 | 8 | 7 | 6 | 5 | 4 | 3 | 2 | 1 | 0 |
| | NCR | | | | | | Horizontal shift | | | | | | | | | |
| 0126h 0127h | 15 | 14 | 13 | 12 | 11 | 10 | 9 | 8 | 7 | 6 | 5 | 4 | 3 | 2 | 1 | 0 |
| | Extended parallel attribute 1 | | | | | | | | Character code 1 | | | | | | | |
| 0128h 0129h | Character code 2 | | | | | | | | Palettes address attribute 1 | | | | | | | |
| 0130h 0131h | Palettes address attribute 2 | | | | | | | | Extended parallel attribute 2 | | | | | | | |
| ... | ... | | | | | | | | ... | | | | | | | |
| ... | Character code No. NCR | | | | | | | | ... | | | | | | | |
| XXXh | Palettes address attribute No. NCR | | | | | | | | Extended parallel attribute No. NCR | | | | | | | |

FIG. 4c

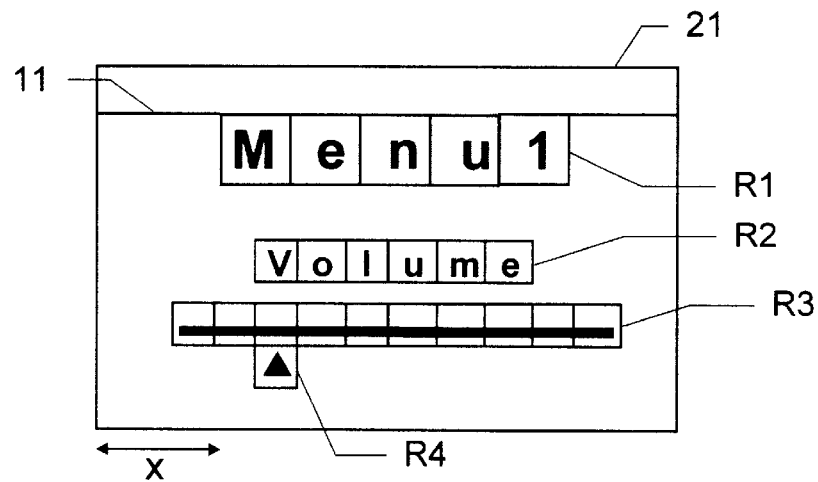

FIG. 5

DEVICE FOR CONTROLLING THE DISPLAYING OF CHARACTERS IN A VIDEO SYSTEM

BACKGROUND OF THE INVENTION

1. Field of the Invention

The present invention relates to the displaying of characters in a video system. It is more particularly concerned with a novel architecture for controlling the displaying and storing of data to be displayed in such a system.

2. Description of the Related Art

Television receivers and video recorders are commonly equipped with on-screen display (OSD) devices for displaying on the screen, in place of the video image or superimposed on the video image, information intended for the user. It is common for example to display the number of the channel viewed when the user changes channel or to display menus to help the user to adjust his television or his video recorder.

In FIG. 1 is represented the video image 1 which is displayed on the screen of a television receiver. In this video image, the area for displaying the characters 2 does not generally cover the whole image. This area 2 is divided into rows 3, 4 which may be of different heights (the height of a row corresponding to the number of video lines required to display it), each row being itself divided into characters 5, 6 likewise of variable size. The set of rows displayed in the area 2 is generally called a screen page. In the following description, the term "screen page" will be employed to denote any set of rows belonging to one and the same video image, these rows being arranged consecutively (for example in the case of a page transmitted according to the Teletext standard) or else being separated by a certain number of video lines containing no displayed characters (for example in the case of menus for adjusting the television or the video recorder). This term screen page is not to be confused with the display screen of the television, that is to say the visible part of the cathode-ray tube of a television.

The known on-screen display devices comprise various types of memory architectures. In a first type of architecture, the information to be displayed is stored in graphical form. That is to say, a table containing the value of each pixel forming the image to be displayed is stored in a memory. If the display is monochrome, each pixel can be represented by a single bit but if a colour display is desired with various possible luminance levels, many more bits per pixel will be necessary. Thus, for an image of N×M pixels, it will be necessary to store a table of N×M×P bits in memory, P being the number of bits required for coding each pixel. It will readily be seen that this type of architecture consumes a great deal of memory.

An alternative to this solution consists in storing, for each pixel, the address of a predetermined colour (coded for example on 4 bits) which is stored in a palette. However, the size of the memory required for this type of architecture is still very considerable.

In a second type of architecture, the various styles of characters available are stored in a read only memory (ROM), termed the character font memory. Each character is stored in the form of a matrix whose intersections represent the elementary points of the character, the value ("0" or "1") of these elementary points indicating whether this point belongs to the foreground or to the background of the character.

The codes of the characters to be displayed are for their part stored in a random access memory (RAM) which provides the above-described read only memory with the code of the character.

Here again there are two known categories of on-screen display devices having this second type of architecture according to the organization of their random access memory. In the first category, a table of fixed size, represented diagrammatically in FIG. 2a, is stored in memory, this table having a fixed "width" l (which depends on the number of characters per row) and a fixed "depth" p (corresponding to the number of rows per image) which are determined by the size of the screen page which it is desired to display. This is why this first category of memory is sometimes called a "screen" memory. The table contains character codes C, for example stored on 8 bits, as well as character attribute codes A which make it possible to define character display parameters (colour, size, underlining, etc.).

The second category uses a memory whose size is one or more rows. In this case, the content of the screen page which it is desired to display is not stored in its entirety, rather only one or more rows of characters forming the said screen page is/are stored. For example, represented in FIG. 2b is a memory of the size of two rows making it possible to store a current row 10 displayed on the screen as well as a row 20, which will be displayed subsequently on the screen, and whose content is generated during the displaying of row 10, the content of row 10 itself being modified during the displaying of row 20 and so on and so forth. Each row contains, as above, character codes C and display attribute codes A.

This second type of architecture, although it may allow a considerable reduction in the size of the random access memory required as compared with the first type of architecture storing the information in graphical form, nevertheless has a number of drawbacks.

Indeed, this type of memory architecture is very rigid. It is only possible, within one and the same screen page, to modify the display attributes of the characters, that is to say their colour or their size. Also, it is necessary to define at the outset what will be the mode of transmission of the display attributes. For example, in FIG. 2a it has been chosen to transmit a display attribute code A with each character code C transmitted. This mode of transmission is generally called "parallel mode". This signifies that the appearance (colour/shape) of the characters can be modified from one character to another. On the other hand, in FIG. 2b it has been chosen to transmit a display attribute only between each word (represented by a string of character codes C). This mode of transmission of the attributes is generally called "serial mode". This signifies that the appearance of the characters will be uniform in each word and can only be modified from one word to another.

The problem with this type of architecture is that it does not allow a change of mode of transmission of the display attributes within one and the same screen page. Now, in certain cases, it may be useful to modify the appearance of the characters from one character to another while in other cases this is of no use whatsoever. According to the choice made, either the display possibilities will be limited but the memory space used will be reasonable, or there will be possibilities of enhanced display but most of the time the memory space will be overdimensioned since it will contain redundant information relating to the display attributes.

Moreover, there are other parameters, such as the number of characters per row, which cannot be modified from one row to another and which are defined only in regard to each screen page. Now, it may be beneficial to be able to modify this type of parameter from one row to another, for example when displaying menus of adjustments, since certain, rows displayed may contain fewer characters than others.

SUMMARY OF THE INVENTION

An object of the present invention is to propose a novel type of memory architecture in an on-sreen display device which offers more possibilities for modifying the display parameters from one row to another within one and the same screen page and which makes it possible to optimize the memory space used according to the applications chosen.

To this end, the invention proposes a device for controlling the displaying of characters in a video system comprising a memory for storing information relating to the displaying of the characters, wherein said memory comprises:
 a first area for storing, at fixed addresses, data and/or parameters for general control of the display; and
 a second area which is divisable into spaces of variable sizes so as to store, in each of the spaces, control parameters and data relating to the displaying of a set of characters belonging to a screen page.

Thus, the memory space is used on the basis of the actual needs of the display and this memory structure makes it possible to modify the display parameters from one set of characters to another.

According to one aspect of the invention, each space of the second area contains the address of the memory space corresponding to the next set of characters, requiring to be displayed, of the screen page.

According to another aspect of the invention, the address of the memory space corresponding to a first set of characters to be displayed is stored in the first area of the memory.

According to a preferred aspect of the invention, each of the spaces comprises:
 a first part, of predetermined format, containing at least control parameters relating to a set of characters; and
 a second part, the format of which is defined by parameters stored in the first part, containing the data corresponding to the said set of characters.

According to a particular embodiment, the first part of each of the spaces furthermore contains display attributes relating to the said set of characters.

According to a particular embodiment, the address of the memory space corresponding to the next set of characters requiring to be displayed is stored in the first part of the memory space corresponding to the set of characters currently displayed.

According to a particular embodiment, the first part of each space comprises parameters for the vertical and/or horizontal positioning of the set of characters in the image displayed by the video system.

According to a particular embodiment, the first part of each space comprises a parameter indicating the number of characters making up the corresponding set of characters of the memory space, the data relating to the said characters being stored in the second part of the memory space.

In a first format for coding the data situated in the second part of a memory space, the said data are coded according to a serial mode and comprise character codes and display attributes transmitted between the words of one and the same set of characters.

In this first coding format, one byte is reserved in the second part of the memory space for the storage of each character.

In a second format for coding the data situated in the second part of a memory space, the said data are coded according to a simple parallel mode and comprise, for each character, a character code and a display attribute.

In this second coding format, two bytes are reserved in the second part of the memory space for the storage of each character.

In a third format for coding the data situated in the second part of a memory space, the said data are coded according to an extended parallel mode and comprise, for each character:
 a character code,
 a character colour attribute containing addresses of colour palettes themselves stored in the first area of the memory, and
 an extended display attribute.

In this third coding mode, three bytes are reserved in the second part of the memory space for the storage of each character.

BRIEF DESCRIPTION OF THE DRAWINGS

Other characteristics and advantages of the invention will become apparent via the following description of a particular, non-limiting embodiment of the invention given with reference to the appended figures in which:

FIG. 3 illustrates the content of the random access memory used in the device according to the invention;

FIGS. 4a, 4b and 4c illustrate, in more detail, the content of certain parts of the memory represented in FIG. 3;

FIG. 5 illustrates one possible example of displaying characters by virtue of the device according to the invention;

DESCRIPTION OF THE PREFERRED EMBODIMENT

Figure 1:
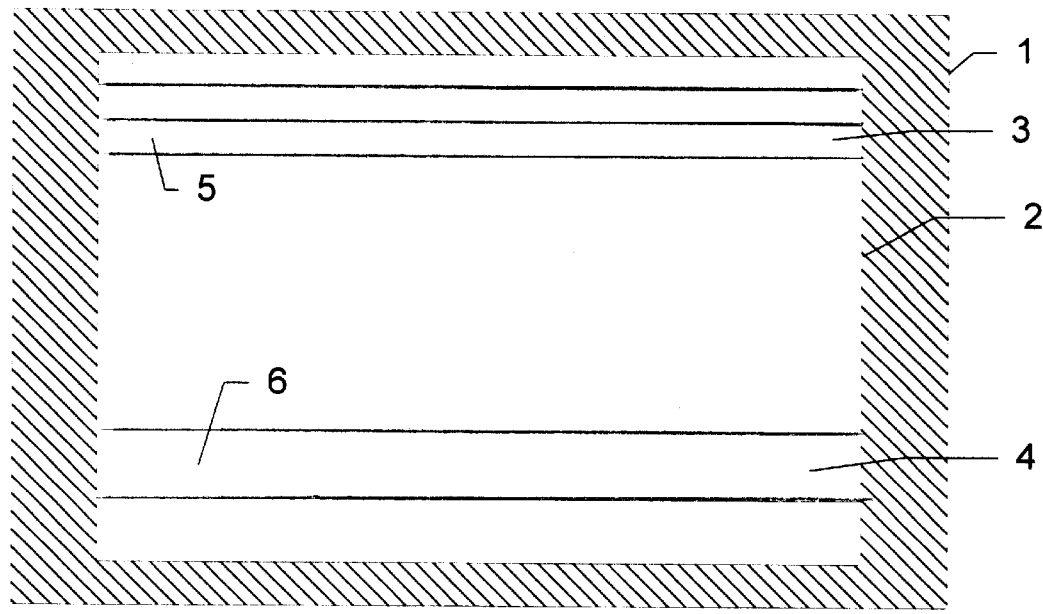
FIG. 1, described above, diagrammatically represents the image which appears on a television screen when characters are displayed.

Represented in FIG. 3 is the content of a random access memory in which are stored the data to be displayed and also parameters for controlling the display according to an architecture in accordance with the invention. In the embodiment illustrated by FIG. 3, the random access memory has a depth of 8 bits, or one byte. That is to say a word 8-bits long is stored at each address of the said memory. These words are then grouped pairwise to form sets of 16 bits.

The content of the memory is represented in the form of a table containing, in the first column, the addresses of the memory which are expressed in hexadecimal base, and in the second column, the content proper of the memory.

According to the invention, this memory is partitioned into two main areas:
 the first area Z1, of fixed size, contains parameters and data serving in the general control of the display, which are stored at fixed addresses;
 the second area Z2, of variable size, is divided into spaces B1, B2, B3, etc., hereafter called "buffers", stored at random addresses, which each contain parameters and data relating to the displaying of a row of characters of a screen page.

The address of the buffer containing the data corresponding to the first row displayed of the screen page is recorded in the first area Z1 of the memory. The buffers are then chained together by virtue of a parameter, the address of the next buffer, which is contained in each buffer. That is to say each buffer contains the address of the buffer containing the data corresponding to the next row requiring to be displayed on the screen.

In more detail, the first area Z1 contains firstly global attributes at the addresses 0000h to 0003h. The first two bytes, stored at the addresses 0000h and 0001h, forming the first 16-bit word, contain the value of the default colour of the areas of the screen where no character is displayed as well as the default transparency value.

The default colour is defined on 9 bits (3 bits for red, 3 bits for green and 3 bits for blue). It is chosen from among a combination of 512 possible colours when initializing the content of the memory. The transparency value, defined on 3 bits, offers 8 possibilities of display with transparency ranging from totally opaque, when only the signal representing the default colour is displayed, to totally transparent, when the video signal alone is displayed.

The global attributes then comprise, at the addresses 0002h and 0003h, two bytes serving to store the address of the first buffer containing the data of the first row displayed mentioned above. In the present example, the address of the first buffer is 0084h.

The first area Z1 finally comprises a palette of foreground colours, at the addresses 0004h to 0023h, and a palette of background colours, at the addresses 0024h to 0043h. These palettes make it possible to store 16 character foreground colours and 16 character background colours, the colours themselves being defined on two bytes from among a choice of 512 possible colours.

Since the entirety of the two bytes is not used to define the colours, which are defined on 9 bits like the default colour, some bits may be used to manage the transparency of the background and of the foreground of the characters, as well as the underlining of the characters.

To choose a particular colour to be applied, for example, to the foreground of a character, it will be sufficient to store with the character the corresponding address (coded on 4 bits) of the palette of foreground colours and to read the content of said palette.

Optionally, it is possible to store extended palettes of foreground and background colours of the characters so as to have a more expansive choice of colours at its disposal. In the example of FIG. 3, these extended palettes are stored in an area Z1', located at the addresses 0044h to 0083h, and make it possible to store 16 additional character foreground colours and 16 additional character background colours. This area Z1', when it exists, is also of fixed size and stored at fixed addresses.

The second area of the memory, referenced Z2, globally, comprises, as was seen above, a set of buffers B1, B2, B3, etc. each containing the data relating to a row of characters. The ordering of the buffers in the memory is entirely unrelated to the order of display of the rows of characters corresponding to the screen since each buffer contains, in a parameter, the address of the next buffer as mentioned above.

Each buffer contains three types of data:
control parameters used, as will be seen later, by the display control unit, such as the size of the buffer, the address of the next buffer to be processed, the number of bits allotted to the transmission of each character, etc.;
parameters determining the positioning of the row on the screen as well as the appearance of the characters of the row (character display attributes); and
data corresponding to the characters to be displayed.

The second area Z2 of the memory has a size which can vary on two counts. Firstly, the number of buffers stored can vary since it depends on the number of rows of characters displayed in a screen page, this number being modifiable with each screen page. Next, the very size of the buffers can be varied. They all comprise a first part of fixed size, equal to 8 bytes, which contains parameters for controlling and positioning the row and attributes defining the size and the shape of the characters of the row. These first parts are for example stored at the addresses 0084h to 0091h for buffer B1, 0102h to 0109h for buffer B2 and 0118h to 0125h for buffer B3 of FIG. 3. The buffers moreover comprise a second part of variable size containing the codes of the characters of the row to be displayed as well as, according to the data coding mode chosen, display attributes defining the appearance of the characters (colour, size, shape, flashing, etc.). The second parts are stored at the addresses 0092h to 0101h, 0110h to 0017h and 0126h to XXXh respectively, for buffers B1, B2 and B3 respectively in the example of FIG. 3.

The content of the buffers will now be described in greater detail while referring to FIGS. 4a to 4c which respectively represent the content of the buffers B1 to B3 of FIG. 3. This description will also be given with reference to FIG. 5 which shows an example of the display possibilities offered by the memory architecture according to the invention.

The first part of each buffer, which has a size and an architecture identical from one buffer to another, will be described only once, with reference to FIG. 4a.

Represented in FIG. 4a is the content of the various bytes making up the buffer B1. As was seen earlier, the bytes are grouped together in pairs to form sets of 16 bits, this solely with the aim of easing the description thereof. It will be noted that the buffer B1 contains the data relating to the displaying of row R1 of FIG. 5 where the image displayed on the screen of a television has been represented by rectangle 21.

The first parameter, stored at the addresses 0084h and 0085h of the memory, defines the vertical positioning of the row R1 in the image. This parameter, defined on 10 bits, contains the number of the T.V. line at which the displaying of row R1 commences. This line is referenced 11 in FIG. 5. The following bits 10 to 15 are left free in the present example but they may in actual fact be used to store other parameters. Moreover, the number of the T.V. line can be coded on 11 bits, for example if the device is used in a high-definition television.

The next two bytes of the buffer B1 contain shape attributes of the row (bits 0 to 7) as well as parameters ARSV (bits 8 to 11) and AREV (bits 12 to 15) which make it possible to define the first and the last active line in the character matrix. Thus, the various character styles are stored in matrix form in a character font read only memory. The above-described parameters are used in very particular cases where it is not desired to display the character in full, for example to produce scrolling menus. In this case, the first and the last line of the character matrix which it is desired to display on the screen are indicated in the parameters ARSV and AREV.

The byte storing the shape attributes of the row (bits 0 to 7) contains various items of information. A number of bits serve to enable or to disable parameters for controlling the appearance of the characters on the screen: flashing of the character, black border around the shape of the character, smoothing of the edges of the character, etc. If these parameters are disabled, it will not be possible to use them in the row. On the other hand, if they are enabled, it will be possible to use these parameters in the row via the display attributes stored with the characters. Other bits define the size of the characters (single/double height, single/double width). Still other bits make it possible to select the format of the matrix defining the style of the characters. Thus, the characters may be stored in the form of a matrix of 9×13 elementary points for certain applications (for example to display text in the Latin alphabet) and in the form of a matrix of 18×26 points for other applications (displaying of graphical symbols or Chinese characters for example).

Finally, the last bits of the shape attribute are used to define the mode of coding the data which are transmitted in the second part, of variable size, of the buffer. According to the preferred embodiment of the invention, there are three modes of coding the data:

serial mode in which one byte per character is reserved, it being possible to store display attributes between the various words of one and the same row of characters;

the parallel mode in which two bytes per character are reserved, the first byte containing a character code and the second containing a character colour and/or shape code;

the extended parallel mode in which three bytes per character are reserved, the first two bytes being similar to those of the parallel mode and the third containing additional attributes and bytes making it possible to extend the character font.

In the buffer B1, it is the simple parallel mode of coding which has been chosen as will be seen later.

The address of the next buffer to be processed is then stored at the addresses 0088h and 0089h. In the present example, this is the buffer containing the data of row R2 (FIG. 5), that is to say the buffer B2 whose start address is 0102h. This address is represented in FIG. 4a as being stored on 11 bits, thus making it possible to define 2048 different addresses. This is appropriate in the case where the memory has a maximum size of 2 kilobytes, but it is also possible, since bits 10 to 15 are left free, to use the entirety of the 16 bits to define the address of the next buffer. In this case, it will be possible for the memory to have a maximum size of 64 kilobytes.

Continuing the description of the first part of the buffer B1, a horizontal shift parameter, stored on 10 bits, which determines the number of pixels x (in FIG. 5) between the start of the video line and the start of the display of the row, and a parameter NCR which represents the number of characters in the row and which is stored on 6 bits are located at the addresses 0090h and 0091h. This parameter NCR will be equal to 5 in the buffer B1 since row R1 contains 5 characters ('M', 'e', 'n', 'u', '1').

The second part of the buffer B1, located at the addresses 0092h to 0101h, is coded as was seen above in parallel mode. Each character of the row R1 is therefore stored on 2 bytes. The first byte (bits 0 to 7) contains the code of the character to be displayed and the second byte (bits 8 to 15) comprises a "B.P. address" attribute (standing for background palette), which contains an address of the palette of background colours, as well as a "F.P. address" attribute (standing for foreground palette), which contains an address of the palette of foreground colours. These attributes make it possible to define respectively the colour of the background and of the foreground of the associated character whose code is stored in the first byte and are together denoted hereafter by the term "palette address attribute".

This parallel mode of coding makes it possible to modify, between two consecutive characters, the colour of the background and of the foreground of the characters, as is illustrated in FIG. 5 in row R1, for example between the character "u" and the character "1".

The buffer B2, whose content is represented in FIG. 4b, comprises a first part, located at the addresses 0102h to 0109h, of the same size and containing the same parameters as the above-described first part of the buffer B1.

The second part of the buffer B2 is coded in serial mode. In this mode of coding, the first two bytes of this second part (which are located at the addresses 0110h and 0111h in the present example) comprise serial attributes. These serial attributes are of two types: foreground serial attributes which contain an address of the palette of foreground colours and background serial attributes containing an address in the palette of background colours. These two types of attribute may furthermore contain bits defining the appearance of the characters on the screen (flashing, italics, etc.).

In the present example, row R2 contains a single word of 6 characters. The serial attributes 1 and 2 stored in the buffer B2 therefore define the colour and the appearance of all the characters of row R2 whose respective codes are stored in the following bytes (located at the addresses 0112h to 0117h) of the second part of the buffer B2.

However it is also possible, when a row of characters contains several words, to transmit, between the words, serial attributes so as to modify the colour of the background or of the foreground of the following characters of the row, these attributes appearing on the screen as space characters. The serial mode coding is especially well suited when desiring to display rows of characters whose appearance is uniform such as row R2 of FIG. 5.

The buffer B3, the content of which is represented in FIG. 4c, illustrates the third above-cited mode of coding the data: the extended parallel mode. The first part of the buffer B3, which part is located at the addresses 0118h to 0125h, is of the same size and contains the same parameters as the already-described first part of the buffer B1.

Figure 2A:
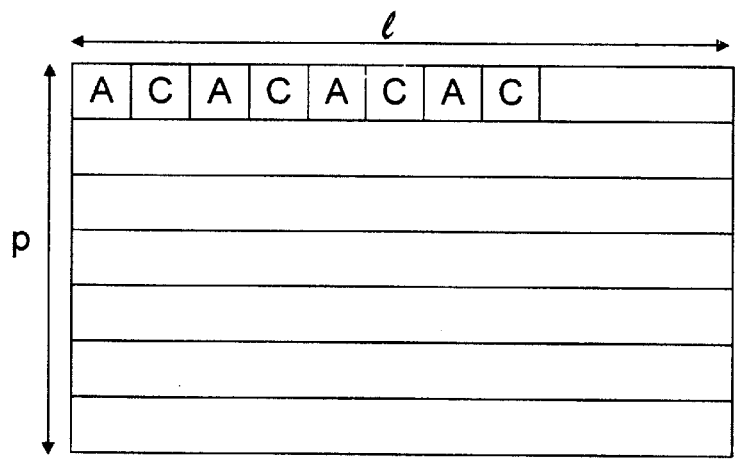
FIGS. 2a and 2b, described above, diagramatically represent two types of memory architectures in known character display devices.
Figure 2B:
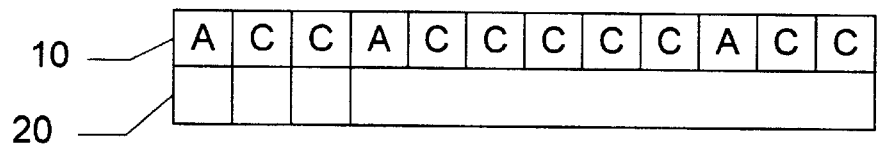

In the second part of the buffer B3, three bytes are used to transmit the data relating to each character: a first byte contains the code of the character, a second byte contains an extended parallel attribute and a third byte contains a palette address attribute which has already been described in conjunction with the buffer B1. The extended parallel attribute contains bits making it possible to define additional character codes (by adding to the first eight bits of the character code), to choose colours in the foreground and background colour extended palettes (area Z1' of FIG. 2) and to control certain aspects of the appearance of the characters on the screen: shade, flashing, etc.

It will be noted that the content of the buffer B3 is not appropriate for displaying row R3 of FIG. 5. This is because the latter contains the same character repeated ten times to form a line having a uniform colour. The serial mode of coding is therefore more appropriate in this case since it uses less memory space for the same result.

Finally, row R4 of FIG. 5 containing a single character, it is equivalent to use the serial mode or the simple parallel mode to store the data relating to this one character.

By virtue of the particular architecture of the random access memory just described, multiple display possibilities are offered by adapting, for each row, the memory space used to the actual needs of the display.

In FIG. 5 is shown an example of a menu display making it possible to adjust the sound volume of a television receiver. The user modifies the volume by actuating his remote control but, so that he is better able to view his adjustment, a cursor represented in row R4 moves along the line represented in row R3.

It may be seen in the example illustrated in FIG. 5 that by virtue of the invention it is possible in a first screen page to have rows of characters of different lengths (in terms of number of characters) and heights, having different colours and aspects from one row to another and to do so by having a memory whose size is optimized according to the actual needs of the display.

Figure 6:
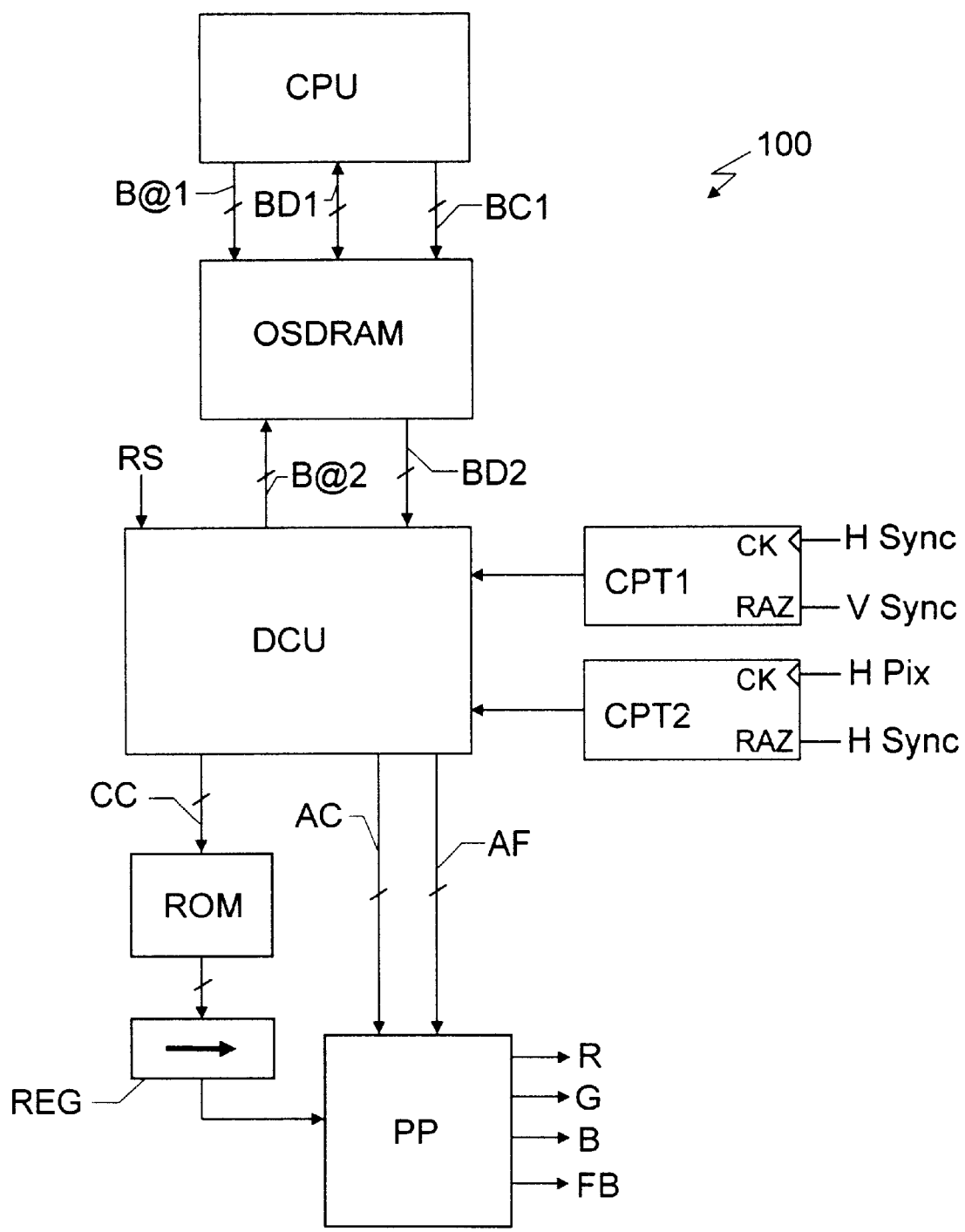
FIG. 6 diagramatically represents a device for controlling the displaying of characters according to the invention.

Represented in FIG. 6 is a device 100 for controlling the displaying of characters in a video system in accordance with the invention. This device essentially comprises a central microprocessor unit CPU, a display control unit DCU and a random access memory OSDRAM which is shared by the previous two units and whose content is of the type described in conjunction with FIGS. 3 and 4a–4c. This random access memory can be dedicated to the character display function or else can be a part of a memory for more general use.

The random access memory OSDRAM is linked to the central microprocessor unit CPU by way of three buses: an address bus B@1 running from the central unit CPU to the memory OSDRAM, a bidirectional data bus BD1 allowing read access or write access to said memory via the central unit as well as a command bus BC1, oriented from the central unit towards the memory, and indicating for example if access on the data bus is made in read mode or write mode.

The random access memory OSDRAM is also linked to the display control unit DCU by way of an address bus B@2, directed towards the memory, and of a data bus BD2, directed towards the display control unit. The unit DCU in fact only makes read accesses to the memory OSDRAM.

In general, the operation of the device is as follows: the central unit CPU writes the content of the memory required for displaying a screen page, comprising control instructions and also data to be displayed. The display is then controlled solely by the unit DCU reading the content of said memory and does not require the intervention of the central unit CPU, at least as long as the content of the screen page remains unchanged.

The function of the control unit DCU is essentially to read the relevant data and parameters from the memory OSDRAM and then to reassign them in real time towards the various units which carry out the displaying of the characters on the screen of the video system (not represented).

This is because the display control unit DCU is linked to a read only memory ROM, in which are stored the character fonts, by way of a bus CC in which character codes are transmitted. These character codes correspond to addresses of the memory ROM at which the corresponding matrices of characters are stored, in the form of 9×13 or 18×26 elementary points. A first role of the unit DCU is therefore to read the character codes stored in the buffers which have been described earlier and to transmit these codes over the bus CC.

Moreover, the display control unit DCU is linked to a pixel processor PP by way of two buses: a bus AC transmitting colour attributes and a bus AF transmitting shape attributes. The bus for the colour attributes has a size equal to the size of the colour palettes stored in the first part Z1 of the memory OSDRAM since it transmits the bits representing either a colour of a palette, or the default colour defined in the global attributes of the memory OSDRAM.

In practice, the unit DCU will read the content of a buffer stored in the second part of the memory OSDRAM so as to display a row of characters. When the buffer is of the type of the buffer B2 for example and contains palette address attributes, the unit DCU transmits these palette addresses over its bus B@2 and recovers the corresponding content of the palettes on its bus BD2 which it then transmits to the bus AC.

The bus for the shape attributes AF contains information relating to the appearance of the characters on the screen: size, flashing, black border around the shape, italics, etc. This information originates in part from the row's shape attribute stored in the first part of each buffer (for example, the size of the characters of the row is defined in this attribute) and in part from the serial attributes or the extended parallel attributes depending on the chosen mode of coding the data.

The character font memory ROM, described above, transmits the matrices corresponding to the characters to a shift register REG which then transmits the lines of the matrix bit by bit to the pixel processor PP. The latter formulates, in a manner known per se, on the basis of these data bits and on the basis of the control bits transmitted by the buses AC and AF, the signals R, G, B containing the characters to be displayed.

The processor PP also formulates an insertion signal FB (standing for "fast blanking") which makes it possible either to insert the text to be displayed in place of the video signal or to display the text in transparent mode with respect to the video signal, according to the content of certain bits of the colour attributes.

The control unit DCU is furthermore clocked by two time bases which make it possible to manage the vertical and horizontal positioning of the characters on the screen. The first time base consists of a vertical positioning counter CPT1 which receives, on its clock input CK, a line synchronization signal H Sync, and on its reset input RAZ a field synchronization signal V Sync, the signals H Sync and V Sync originating from the video signal into which the characters are inserted. The second time base consists of a horizontal positioning counter CPT2 receiving on its clock input CK the pixel clock H Pix, which beats for example at a frequency of 50 Hz if the video signal is coded in a European standard (PAL, SECAM), and on its reset input RAZ the line synchronization signal H Sync.

The operation of the device just described essentially comprises the following steps: for each new screen page which is to be displayed, the first step which is performed by the central unit CPU consists in splitting the random access memory OSDRAM into two parts, that is to say in reserving the space necessary for storing the first part Z1 (and possibly Z1' if extended colour palettes are used) of the memory. Next, the content of the first part of the memory is initialized: thus, the address of the first buffer in which the display control unit DCU will be able to read the data relating to the first row to be displayed, the value of the default colour as well as the colour values of the various palettes are stored. These colour values may be reinitialized with each new screen page, or else remain stable over several screen pages. The central unit CPU then fills, at minimum, the content of the first buffer corresponding to the first row requiring to be displayed.

The next step consists in triggering the operation of the display control unit DCU by way of a signal RS which triggers the reading by the unit DCU of the address of the first buffer requiring to be processed and of a number of other initialization parameters.

Next, the central unit CPU and the display control unit DCU will operate in parallel until the content of the last row of the screen page has been stored in the memory OSDRAM.

On the one hand, the unit DCU reads the content of the current buffer (which at the outset is the first buffer) and processes it as was seen above so that the corresponding row is displayed on the screen. On the other hand, and at the same time, the central unit CPU fills the content of the next buffer, that is to say of the buffer which will be processed by the unit DCU immediately after the current buffer and which contains the data relating to the row following that which is being displayed. These data are written to the memory OSDRAM, commencing with the address which was indicated in the "address of the next buffer" field of the current buffer.

Once the content of the next buffer has been filled completely and the current buffer has finished being displayed, an interrupt is generated so as to indicate to the display control unit DCU that it can commence processing the next buffer which becomes the current buffer. The procedure continues in this way in a loop until the buffer containing the data of the last row of a screen page has been filled. When the unit DCU has completed the processing of the displaying of the last row of the screen, an interrupt is generated and the unit DCU is reinitialized. It thus restarts the processing of the first buffer.

Then, and as long as the content of the screen page remains unchanged, the unit DCU continues to process in a loop the various buffers containing the data making up the screen page without requiring the intervention of the central unit CPU which is thus freed to perform other operations. When a new screen page is to be displayed, the first step which was described previously is returned to.

The entire description has been given by indicating that each buffer contained data relating to the displaying of a row of a screen page but it is also possible to choose to store, in each buffer, data relating to every set of characters belonging to one and the same screen page.

What is claimed is:

1. Device for controlling the displaying of characters in a video system comprising a memory for storing information relating to the displaying of the characters, wherein said memory comprises:

a first area for storing data and/or parameters for general control of the display; and a second area which contains spaces of variable sizes so as to store, in each of the spaces, control parameters and data relating to the displaying of a set of characters belonging to a screen page wherein each space of the second area contains the address of the memory space corresponding to the next set of characters to be displayed from the screen page.

2. Device according to claim 1, wherein the address of the memory space corresponding to a first set of characters to be displayed is stored in the first area of the memory.

3. Device according to claim 1, wherein each of the spaces comprises:

a first part, of predetermined format, containing at least control parameters relating to a set of characters; and a second part, the format of which is defined by parameters stored in the first part, containing the data corresponding to said set of characters.

4. Device according to claim 1, wherein each set of characters stored in a space of the second area is a row of characters.

5. Device according to claim 3, wherein the first part of each of the spaces furthermore contains display attributes relating to said set of characters.

6. Device according to claim 1, wherein the data and/or parameters for general control of the display are stored at fixed addresses in the first area of said memory.

7. Device according to claim 3, wherein the address of the memory space corresponding to the next set of characters requiring to be displayed is stored in the first part of the memory space corresponding to the set of characters currently displayed.

8. Device according to claim 3, wherein the first part of each space comprises parameters for the vertical and/or horizontal positioning of the set of characters in the image displayed by the video system.

9. Device according to claim 3, wherein the first part of each space comprises a parameter indicating the number of characters making up the corresponding set of characters of the memory space, the data relating to said characters being stored in the second part of the memory space.

10. Device according to claim 3, wherein in a first format for coding the data situated in the second part of a memory space, said data are coded according to a serial mode and comprise character codes and display attributes transmitted between the words of one and the same set of characters.

11. Device according to claim 10, wherein one byte is reserved in the second part of the memory space for the storage of each character.

12. Device according to claim 3, wherein in a second format for coding the data situated in the second part of a memory space, said data are coded according to a simple parallel mode and comprise, for each character, a character code and a display attribute.

13. Device according to claim 12, wherein two bytes are reserved in the second part of the memory space for the storage of each character.

14. Device according to claim 3, wherein in a third format for coding the data situated in the second part of a memory space, said data are coded according to an extended parallel mode and comprise, for each character:

a character code, a character colour attribute containing addresses of colour palettes themselves stored in the first area of the memory, and an extended display attribute.

15. Device according to claim 14, wherein three bytes are reserved in the second part of the memory space for the storage of each character.

* * * * *